United States Patent [19]

Goode

[11] 4,023,690
[45] May 17, 1977

[54] OBJECT LOADING AND UNLOADING APPARATUS

[76] Inventor: Robert D. Goode, 7201 W. Kellogg, Wichita, Kans. 67207

[22] Filed: July 2, 1975

[21] Appl. No.: 592,479

[52] U.S. Cl. .............................. 214/146.5; 214/78; 214/130 C; 214/501; 214/DIG. 4
[51] Int. Cl.² .......................................... B60P 1/32
[58] Field of Search ................. 214/78, 83.24, 85.1, 214/130 C, 146.5, 501, 505, 515, DIG. 4, DIG. 3, 517; 298/12, 13, 14, 15, 16

[56] References Cited

UNITED STATES PATENTS

| 923,028 | 5/1909 | Davis | 214/83.24 X |
|---|---|---|---|
| 1,431,363 | 10/1922 | Bowen | 214/146.5 |
| 1,867,844 | 7/1932 | Jungersen | 214/146.5 X |
| 1,870,573 | 8/1932 | Kuchar | 214/517 X |
| 2,232,197 | 2/1941 | Anthony | 214/146.5 |
| 2,552,627 | 5/1951 | Fontaine | 298/16 |
| 2,821,315 | 1/1958 | Bucher | 214/505 |
| 3,067,966 | 12/1962 | Hicks | 214/146.5 X |
| 3,090,510 | 5/1963 | Nodwell | 214/85.1 |
| 3,429,465 | 2/1969 | Gardner | 14/83.24 |
| 3,896,956 | 7/1975 | Hostetler | 214/501 |

FOREIGN PATENTS OR APPLICATIONS 42,963  3/1908  Switzerland .................. 298/12

Primary Examiner—L. J. Paperner
Attorney, Agent, or Firm—Henderson, Strom & Sturm

[57] ABSTRACT

An object loading and unloading apparatus of a type having a framework adapted to be connected to a truck bed. A track is connected to the framework, the track having a forward horizontal portion and rearward inclined portion. A frame having forklift members connected perpendicularly to the bottom thereof has four wheels adapted to ride on the track. Two of the wheels ride primarily on the inclined portion of the track and the other two wheels ride primarily on the forward horizontal portion of the track. The frame is movably mounted on the track so that in one position the forklift members are horizontal and can be driven under an object to be transported. A winch is connected to the framework and has a cable which connects to a pulley on the top of the frame for selectively pivoting the frame and forklift members and for pulling such frame and thereby an object on the forklift members onto the track and thereby onto a truck bed. The winch is further utilized for unloading the object by releasing the frame and allowing it to roll down the track by gravity to one position and then to pivot, also by the force of gravity, into an unloading position.

1 Claim, 9 Drawing Figures

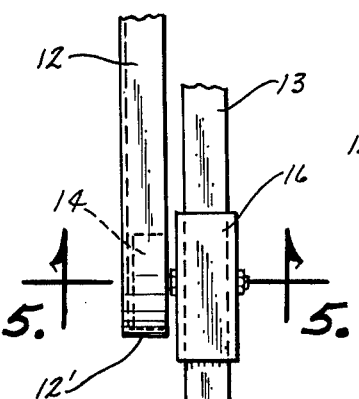
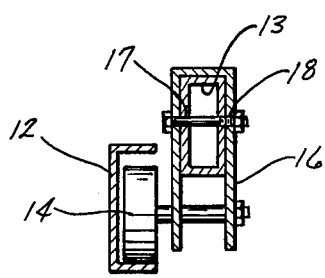
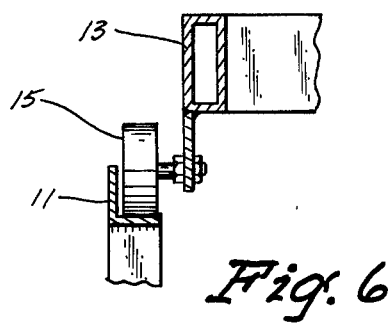
Fig. 4    Fig. 5    Fig. 6
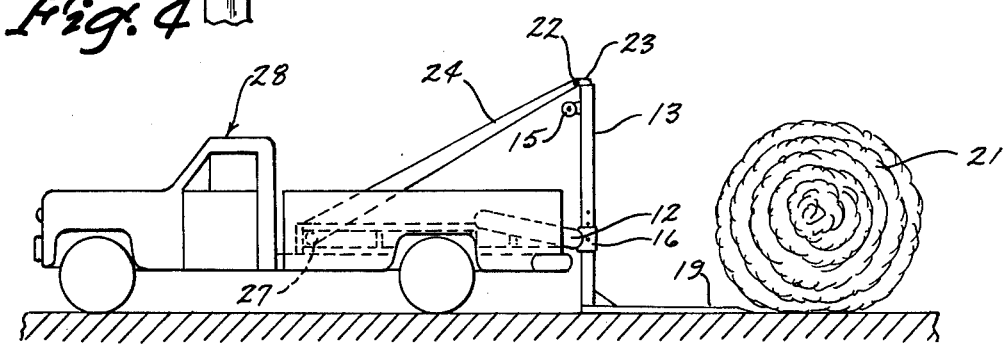
Fig. 7
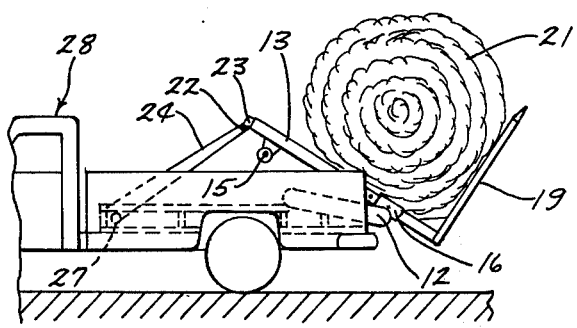
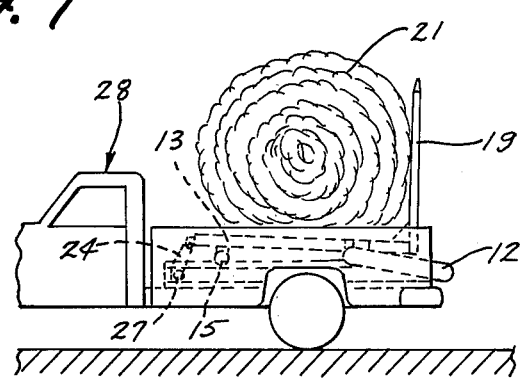
Fig. 8    Fig. 9

OBJECT LOADING AND UNLOADING APPARATUS

BACKGROUND OF THE INVENTION

The present invention relates generally to an object loading and unloading device for a truck, and more particularly to a forklift-type loading and unloading device which is winch operated. In the recent past and even somewhat today, the common manner of handling hay is to bale it into small bales which are light enough to be manually loaded or unloaded. However, one of the most increasingly popular methods of handling hay is to use a baler which produces large round bales of hay weighing approximately 1,000 to 3,000 pounds, for example. Since these bales obviously are too heavy to be handled by hand, there is developed a real need for equipment to transport such large bales.

Forklift devices have been devised for attachment to the hydraulic hitches of agricultural tractors, and these devices have proven to be quite satisfactory for transporting bales for short distances. When it is desired to transport such bales over longer distances, tractors are not very practical because they do not travel at normal highway speeds. Consequently, these large bales must be lifted by a forklift device attached to a tractor or other machine, onto a truck and transported to the final destination where it must then be unloaded, usually by utilizing similar forklift equipment.

Because of the above mentioned circumstances, it would be desirable to have equipment on the truck itself which is capable of loading and unloading such large objects as the aforementioned large bales of hay. This is true whether long or short distance transportation is contemplated.

SUMMARY OF THE INVENTION

The present invention relates to a device which is adapted to be connected to a truck for loading and unloading objects to and from the truck bed. A track is connected to the framework of such device and has a forward horizontal portion and a rearward inclined portion thereof. A frame having forklift members connected to one end thereof has rollers thereon which are movable on the track. One pair of rollers which are located closest to the forklift members are designed to ride primarily upon the inclined portion of the track and cooperate with a lower portion of the track so as to remain on the track at all times. The frame is movable from one loading position, wherein the forklift members are parallel to and adjacent to the ground, to a second position whereby the frame and forklift members are pivoted about the lower set of rollers. A winch and cable attached to the framework and to one end of the frame is operable to selectively pivot the frame about the lower set of rollers, and to further pull the frame and thereby anything loaded thereon off the track and onto the truck into a loaded position. The winch is also operable to release the frame, forklift members and the objects loaded thereon so that these members can move by the force of gravity down to the bottom of the track, and at such point then pivot to the unloading position.

An object of the present invention is to provide a device for loading and unloading objects to and from a truck.

Another object of the invention is to provide a mechanism for handling large bales of hay using only a small truck.

Other objects, advantages and novel features of the present invention will become apparent from the following detailed description of the invention when considered in conjunction with the accompanying drawings.

BRIEF DESCRIPTION OF THE DRAWINGS

FIG. 4 is a partial view taken along line 4—4 of FIG. 2;

FIG. 5 is a cross-sectional view taken along line 5—5 of FIG. 4;

FIG. 6 is a partial cross-sectional view taken along line 6—6 of FIG. 3;

FIG. 7 is a side elevational view showing the present invention in a position in readiness to load a large bale of hay;

FIG. 8 is a side elevational view, like FIG. 6, but showing the device having been driven under a bale of hay and partially loaded thereon; and FIG. 9 is a side elevational view of the present invention showing the loaded position of a large bale of hay picked up by the present invention.

DESCRIPTION OF THE PREFERRED EMBODIMENT

Figure 1:
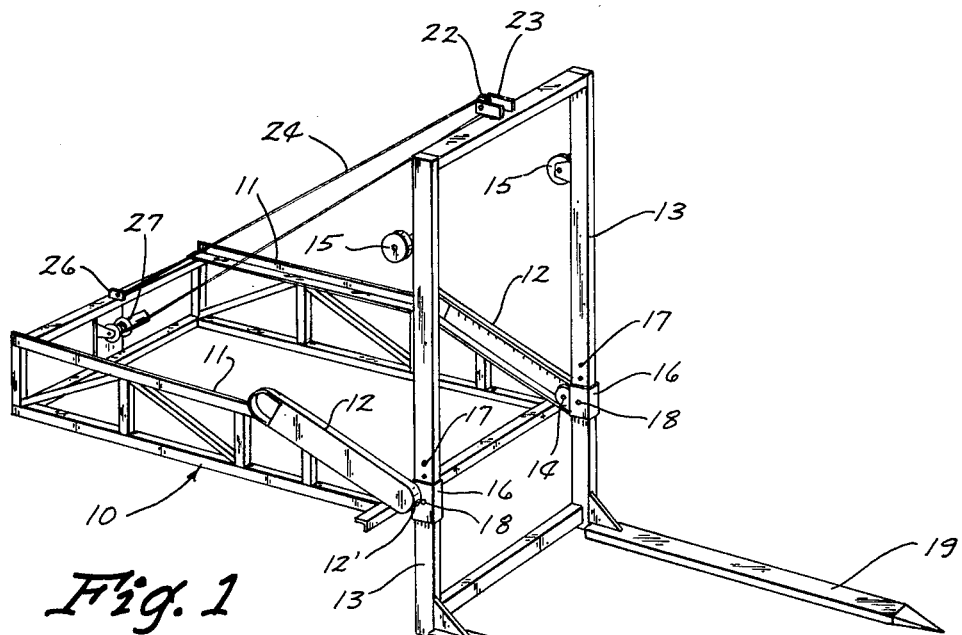
FIG. 1 is a perspective view of the present invention showing the present invention in a position to initially load or finally unload an object.

Referring now to the drawings wherein like reference numerals designate identical or corresponding parts throughout the several views, FIG. 1 shows a framework 10 which has a horizontal set of tracks 11 attached to the forward end thereof, and an inclined set of tracks 12 attached to the rearward end thereof. This frame 10 can be bolted or otherwise attached to the bed or frame of a truck as will be understood by viewing the drawings.

A frame 13 is movably mounted to the tracks 11 and 12 by lower rollers 14 and upper rollers 15. The lower rollers 14 are rotatably mounted to the frame 13 by the brackets 16. These rollers 14 and brackets 16 are adjustable with respect to the frame 13 by virtue of the openings 17 in the frame 13 and the opening 18 in each of the brackets 16, whereby a bolt or other pin may be inserted through matching holes 17 and 18. This feature is very desirable in order to be able to adjust the vertical position of the forklift members 19, which are rigidly attached to the bottom of the frame 13.

Referring briefly to FIG. 7, it can be seen that it is normally desirable to position the forklift members 19 such that they are adjacent to the ground when in the position of FIG. 7 so as to be able to slide under an object to be loaded such as the bale 21 as shown in FIGS. 7-9.

A pulley 22 is attached to the top of the frame 13 by a bracket 23. A cable 24 is received around the pulley 22 and is attached at one end 26 to the frame 10, and at the other end to the reel of winch 27. This winch 27 could be operated hydraulically or electrically, for example.

Figure 2:
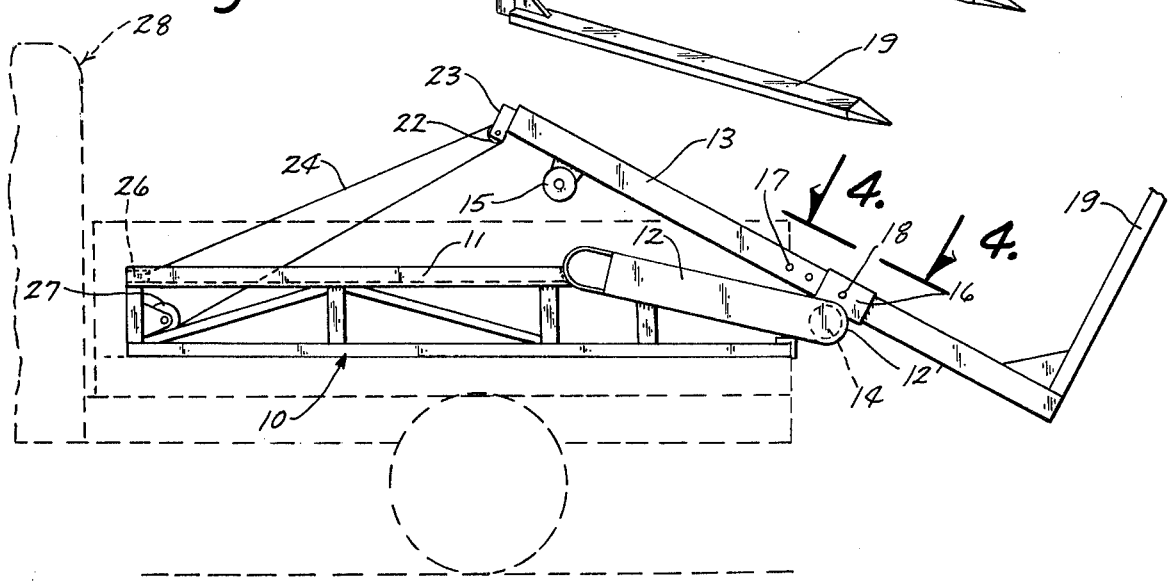
FIG. 2 is a side elevational view of the present invention showing a device in a half loaded or half unloaded position.

Referring to FIGS. 4 and 5, it can be clearly seen how the wheels or rollers 14 are received in the inclined tracks 12. In FIGS. 1, 2 and 4 it can be seen that the end 12' of the tracks 12 prevent the fame 13 from being dislodged from the tracks. Also, when the wheels 14 are in abutment with the end 12' of the inclined tracks 12, the pivoting as shown by the transition between FIGS. 1 and 2, for example, can occur.

Figure 3:
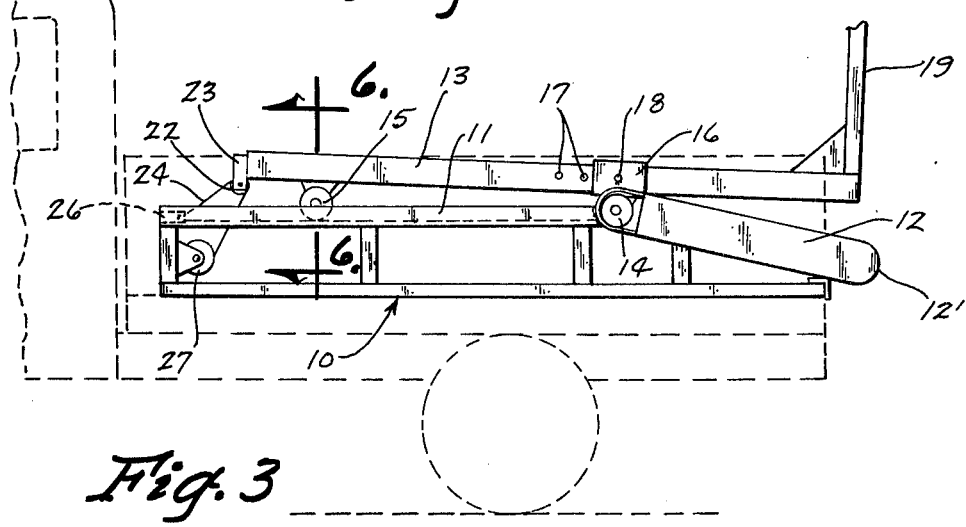
FIG. 3 is a side elevational view showing the present invention in a loaded position.

In operation, the present invention would be mounted to a truck or other vehicle 28 as shown in FIG. 7 and would be backed under a bale 21 or other object. Once the forklift members 19 are received under the bale 21, the winch 27 would then be energized in order to reel up the cable 24 and to thereby pivot the frame 13 to the position as shown in FIG. 8. Further reeling up of cable 24 by utilizing the winch 27 would pull the bale 21 and the frame 13 completely onto the pickup truck 28. The upper or forward rollers 15 would contact the horizontal tracks 11 somewhere in between the position shown in FIG. 8 and FIG. 9, and after that time, would roll upon the tracks 11 as is clearly shown in FIGS. 3, 6 and 9.

When it is desired to unload the objects such as a bale of hay 21, the above process is reversed whereby the winch 27 is activated to unwind or unreel the cable 24 and allow the bale by gravity to move sequentially to the position shown in FIG. 8 and then to a position whereby the bale is resting on the ground with the forklift members 19 thereunder. At such time the pickup truck 28 can then be moved forwardly so that the forklift members 19 are out from under the bale 21 to the position as shown in FIG. 7. In order to transport the present invention from place to place, it would, of course, be desirable to move it to the position shown in FIG. 3 whether or not a bale or other object was loaded thereon.

Accordingly, it can be seen that the present invention does indeed provide a very useful device for loading large bales or other objects to and from a truck without the need for special forklift trucks or tractors to aid in this function. Obviously, many modifications and variations of the present invention are possible in light of the above teachings. It is therefore to be understood that, within the scope of the appended claims, the invention may be practiced otherwise than as specifically described.

I claim:

1. Apparatus for loading and unloading objects comprising:

a framework rigidly attached to a prime mover;

a frame having a pair of fork members connected thereto adjacent one end thereof, said fork members being disposed at a right angle with respect to said frame, said frame being pivotally mounted on said framework;

track means rigidly connected to said framework, said track means including a first section which is substantially horizontally disposed and a second section which is inclined at an angle between vertical and horizontal whereby one end of said track means is lower than the other end thereof;

a first wheel rotatably mounted along a first axis to one side of said frame intermediate the ends of the frame, said first wheel being disposed on the second section of the track means;

means for preventing said first wheel from moving out of said second section;

first means for selectively adjusting the position of said first wheel with respect to said frame, said first adjusting means comprising a first bracket member slideably received on a first frame member, one of said first bracket member and said first frame member having a first opening therein and the other of said first bracket member and said first frame member having a first plurality of holes therein, and first pin means for selectively being received in said first opening and in one of said first plurality of holes;

a second wheel rotatably mounted along said first axis to the other side of said frame intermediate the ends of the frame, said second wheel being disposed on the second section of the track means;

means for preventing said second wheel from moving out of said second section;

second means for selectively adjusting the position of said second wheel with respect to said frame, said second adjusting means comprising a second bracket member slideably received on a second frame member, one of said second bracket member and said second frame member having a second opening therein and the other of said second bracket member and said second frame member having a second plurality of holes therein, and second pin means for selectively being received in said second opening and in one of said second plurality of holes;

a third wheel rotatably mounted along a second axis to said one side of the frame, said third wheel being receivable on the first section of said track means;

a fourth wheel rotatably mounted along said second axis to said other side of the frame, said fourth wheel being receivable on the first section of said track means; and actuating means for selectively moving said frame with respect to said framework, said actuating means including a winch connected to said framework, a pulley connected to the other end of said frame, and a cable connected to said winch at one end thereof and to said framework at the other end thereof, said cable being disposed around one side of said pulley.

* * * * *